United States Patent
Lapicque et al.

(10) Patent No.: US 11,700,419 B2
(45) Date of Patent: *Jul. 11, 2023

(54) RE-ENCODING PREDICTED PICTURE FRAMES IN LIVE VIDEO STREAM APPLICATIONS

(71) Applicant: NVIDIA Corporation, Santa Clara, CA (US)

(72) Inventors: Olivier Lapicque, San Jose, CA (US); Srinivas Anne, Freemont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,248

(22) Filed: Feb. 28, 2022

(65) Prior Publication Data
US 2022/0182715 A1    Jun. 9, 2022

Related U.S. Application Data

(63) Continuation of application No. 16/690,669, filed on Nov. 21, 2019, now Pat. No. 11,265,599.

(60) Provisional application No. 62/860,212, filed on Jun. 11, 2019.

(51) Int. Cl.
| | | |
|---|---|---|
| H04N 21/4402 | (2011.01) | |
| A63F 13/86 | (2014.01) | |
| H04N 19/124 | (2014.01) | |
| H04N 19/184 | (2014.01) | |
| H04N 19/50 | (2014.01) | |
| H04N 21/2187 | (2011.01) | |
| H04N 21/433 | (2011.01) | |
| H04N 21/434 | (2011.01) | |
| H04N 21/478 | (2011.01) | |
| H04N 21/854 | (2011.01) | |

(52) U.S. Cl.
CPC ......... *H04N 21/4402* (2013.01); *A63F 13/86* (2014.09); *H04N 19/124* (2014.11); *H04N 19/184* (2014.11); *H04N 19/50* (2014.11); *H04N 21/2187* (2013.01); *H04N 21/433* (2013.01); *H04N 21/434* (2013.01); *H04N 21/4781* (2013.01); *H04N 21/854* (2013.01)

(58) Field of Classification Search
None
See application file for complete search history.

(56) References Cited

U.S. PATENT DOCUMENTS

| | | |
|---|---|---|
| 6,965,643 B1 | 11/2005 | Maeda et al. |
| 2004/0231004 A1 | 11/2004 | Seo |
| 2007/0263731 A1 | 11/2007 | Kamada et al. |
| 2009/0119730 A1 | 5/2009 | Perlman et al. |

(Continued)

*Primary Examiner* — Rebecca A Volentine
(74) *Attorney, Agent, or Firm* — Taylor English Duma L.L.P.

(57) ABSTRACT

In various examples, a media stream may be received by a re-encode system that may leverage a recode engine to convert (e.g., at an interval, based on a request, etc.) an inter-frame associated with the media stream to an intra-frame. The intra-frame may be converted from the inter-frame using parameters or other information associated with and received with the media stream. The converted intra-frame may be merged into an updated segment of the media stream in place of the original inter-frame to enable storage of the updated segment—or a portion thereof—for later use.

20 Claims, 8 Drawing Sheets

(56) References Cited

U.S. PATENT DOCUMENTS

| | | |
|---|---|---|
| 2010/0150238 A1* | 6/2010 | Watanabe .......... H04N 19/109 |
| | | 375/E7.243 |
| 2013/0016781 A1 | 1/2013 | Syed |
| 2015/0156511 A1 | 6/2015 | Lundberg |
| 2015/0381978 A1 | 12/2015 | Dunphy |
| 2016/0119633 A1* | 4/2016 | Neuman ............ H04N 19/162 |
| | | 375/240.02 |
| 2016/0234504 A1 | 8/2016 | Good et al. |
| 2017/0064329 A1 | 3/2017 | Lawrence |
| 2018/0152670 A1 | 5/2018 | Zhou et al. |

* cited by examiner

RE-ENCODING PREDICTED PICTURE FRAMES IN LIVE VIDEO STREAM APPLICATIONS

CROSS-REFERENCE TO RELATED APPLICATIONS

This application is a continuation of U.S. application Ser. No. 16/690,669 filed on Nov. 21, 2019, which itself claims the benefit of U.S. Provisional Application No. 62/860,212, filed on Jun. 11, 2019, the contents of each of which are hereby incorporated by reference in their entirety.

BACKGROUND

Livestreaming refers to any number of services in which a live media (e.g., video) stream or signal is digitized, compressed, and transmitted from a source to a destination, where it can then be decompressed, decoded, and displayed. The ability to livestream media has unlocked an enormous range of possibilities for residential, commercial, and governmental applications. For example, in recent years, livestreaming has evolved into a tool to engage audiences on a global scale, with livestreaming services now encompassing a wide variety of platforms from social media and professional sports, to movies and cloud video gaming (e.g., NVIDIA GeForce Now). While the popularity of livestreaming has increased in recent years, so too has the desire to capture (e.g., save) portions of a livestream for later use (e.g., for re-watching, distribution, sharing, etc.).

In conventional systems, capturing portions (e.g., segments) of a live media stream for later use is a processing, storage, and time intensive task. For example, livestreaming requires more computer processing and network resources while also reducing efficiency (low latency during encoding and stream delivery) as compared to other methods of streaming (e.g., streaming pre-recorded video). To reduce the processing overhead and bandwidth required for transmission while maintaining the perceptual quality of the media stream (e.g., minimizing visual impairments such as block distortion, blurring, edge activity, noise, jerkiness, pixilation, etc.), many livestreaming systems utilize digital video codecs (e.g., encoder/decoder, compressor/decompressor, etc.) to compress (e.g., encode) video data (e.g., frames) into specifically arranged series, each called a Group of Pictures (GOP). For example, many conventional livestream media systems encode live media streams (e.g., sequences of video frames) into an inter-frame only GOP structure (e.g., IPPPPPPPP), where the first frame is an intracoded (I) frame (or other intra-frame) and the remaining frames are predictive coded (P) frames (or other inter-frame types). Typically, I frames (and other intra-frame types) are the largest frame type (requiring the most bits) and can be decoded on the receiving end without requiring data from any other frame. For example, an I frame may include data representative of pixel values for each pixel in a frame. In contrast, P frames are smaller than I frames and are coded with motion or pixel value changes from the most recent I or P frame (e.g., a P frame contains only the information that is different from the previous frame(s)).

As a result of the additional computer processing and network resources required for livestreaming, an inter-frame only GOP structure type is widely used due to its low encoding latency, reduced bandwidth requirements, and minimal storage consumption. Moreover, while GOP structure and length can vary considerably, the use of GOP structures with longer inter-frame-only sequences is also widely used to reduce bandwidth and reduce processor load on the encoder and/or decoder. However, because inter (P) frames always reference to a prior or future frame (e.g., I frame, P frame, B frame, etc.), capturing selected portions or segments of an inter-frame only GOP structure in a live media stream requires first receiving the entire stream, saving the entire stream, and then capturing the selected portions or segments starting from at least one intra-frame. For example, a user (e.g., gamer, streamer, etc.) may be playing—via livestream in a cloud gaming architecture—a game instance of a video game and may decide to record a specific action sequence (e.g., make a highlight). If the action sequence starts at a point (e.g. frame) in the live media stream, and the live media stream is a P frame only GOP structure, due to the lack of an intra-frame upon which the P frames use as reference, the live media stream system would be unable to start recording at the desired spot without first receiving, saving, and analyzing the entire stream.

In an attempt to remedy these deficiencies, some live media stream capture systems locate the nearest I frame from which to start the recording. This technique however, requires that the system wastes memory storage to recode additional portions of the live media stream, as well as to recode portions of the stream the user has no interest in. In addition, because there may be only one I frame in a P frame only GOP structure, the nearest I frame is always the first I frame, meaning a significant portion—if not all—of the stream needs to be stored, as described above. Other conventional live media stream capture systems, in contrast, transcode (e.g., decodes, re-encodes) the entire live media stream into a different GOP structure format in order to save the selected portion of the live media stream. This technique, however, not only wastes time resources, it also increases processor load on the system.

SUMMARY

Embodiments of the present disclosure relate to re-encoding picture frames to capture segments in live video stream applications. Systems and methods are disclosed that leverage a recode engine to convert (e.g., periodically or based on an indication) existing inter-frames of an inter-frame only GOP structured media stream into one or more intra-frames to enable the selective capture of segments of a media stream while minimizing processor load (e.g., reducing the burden on CPU and/or GPU usage) as well as reducing the requirement of transcoding and storing an entire stream prior to generating a segment.

In contrast to conventional systems, such as those described above, the present system identifies and converts inter-frames of a video stream (e.g., media stream) into intra-frames to enable selective recording of segments of the video stream. For example, a user (e.g., gamer) playing an instance of a video game (e.g., a live media stream) may wish to record and/or save a specific action sequence (e.g., make a highlight), and may indicate the specific point at which the user desires the recording to start. Upon receiving a request to save a specific portion of a live media stream, a recode engine may convert the inter-frame (e.g., P frame or B frame) associated with the start point into an intra-frame (e.g., I frame, Instantaneous Decoder Refresh (IDR) frame, etc.) that is compliant with the original live media stream (e.g., using a codec such as H.263, H.264, MPEG4, HEVC, 3GP, MPEG2, etc.).

In another example, rather than converting the inter-frame (e.g., P frame or B frame) into an intra-frame (e.g., I frame, IDR frame, etc.) based on receiving an indication to start a recording, the recode engine may analyze the incoming live media stream and determine when an intra-frame needs to be added into the stream based on the GOP length of the output stream and/or a hard-coded periodicity. For example, the recode engine may be hard-coded to periodically convert inter-frames (e.g., P frames, B frames, etc.) to intra-frames (e.g., I frames, IDR frames, etc.) every 30 frames.

Once converted, the recode engine may merge the intra-frame into the original live media stream and update the headers of subsequent inter-frames of the live media stream to reference the newly converted and merged intra-frame. The live media stream with the merged (e.g., inserted, replaced) intra-frame (or a segment thereof) may then be recorded and saved for later use (e.g. viewing, sharing, etc.). As a result, the system may benefit from the efficiency and reduced compute requirements of inter-frame only streams (e.g., P-frame only streams, such as for livestreaming) while being capable of capturing and storing segments of the stream without first transcoding the entire stream.

BRIEF DESCRIPTION OF THE DRAWINGS

The present systems and methods for re-encoding picture frames to capture segments in video stream applications are described in detail below with reference to the attached drawing figures, wherein.

DETAILED DESCRIPTION

Systems and methods are disclosed related to re-encoding picture frames to capture segments in live video stream applications. For example, as a user plays an instance of a video game (e.g., in a cloud gaming environment, such as the environment of FIG. 5), or streams a live or pre-recorded event, the user may wish to record and/or save a specific portion or segment of the stream, and may indicate the specific point at which the recording should start. In some embodiments, upon receiving a request to save a specific portion of a live or pre-recorded media stream, a recode engine may receive an uncompressed inter-frame associated with the indicated start position from within the live media stream. The recode engine may convert the inter-frame (e.g., P frame or B frame) into an intra-frame (e.g., I frame, IDR frame, etc.) that is compliant with the original live media stream (e.g., using a codec such as H.263, H.264, MPEG4, HEVC, 3GP, MPEG2, etc.). To ensure the newly encoded, or re-encoded, intra-frame is compliant with the original media stream, the recode engine may convert the inter-frame into an intra-frame based at least on parameters derived directly from the Sequence Parameter Set (SPS) and Picture Parameter Set (PPS) of the original live media stream (e.g., bitstream). In some embodiments, rather than converting the inter-frame into an intra-frame based on receiving an indication to start a recording, the recode engine may analyze the incoming live media stream and determine when an intra-frame needs to be added into the stream based on the GOP length of the output stream. For example, the recode engine may be hardcoded to periodically convert inter-frames to intra-frames—such as, without limitation, every 20 frames, every 30 frames, every second, every three seconds, etc.

Once converted, the recode engine may merge the intra-frame into the original live media stream and update the headers of subsequent inter-frames of the live media stream to reference the newly converted and merged intra-frame. The live media stream with the merged (e.g., inserted) intra-frame may then be sent to a stream recorder that extracts the specific portion (e.g., capture segment) of the live media stream using the inserted intra-frame as the starting (or reference) point, and may generate and output the capture segment to a file sink. The file sink (e.g., an MP4 File Sink, 3GP File Sink, WMV File Sink, FLV File Sink, etc.) may store the capture segment in a container file (e.g., MPEG4 container file, 3GP container file, MPEG-2 container file, etc.) format for later use (e.g., watching, sharing, streaming, distribution, etc.).

In this way, by using a recode engine to periodically convert existing inter-frames of an inter-frame only GOP structure (live) media stream into intra-frames, the systems and methods of the present disclosure enable selective capture of segments of a live media stream while minimizing processor load (e.g., reducing the burden on CPU and GPU usage) as well as reducing the requirement of transcoding and storing an entire stream prior to generating a segment. Additionally, because the entire stream does not first need to be saved and/or transcoded, segment capture may occur more quickly than a traditional transcode-based file capture system by enabling the flexibility to insert an intra-frame at any point in a media stream—such as a live media stream using a P frame only GOP structure.

Figure 1:
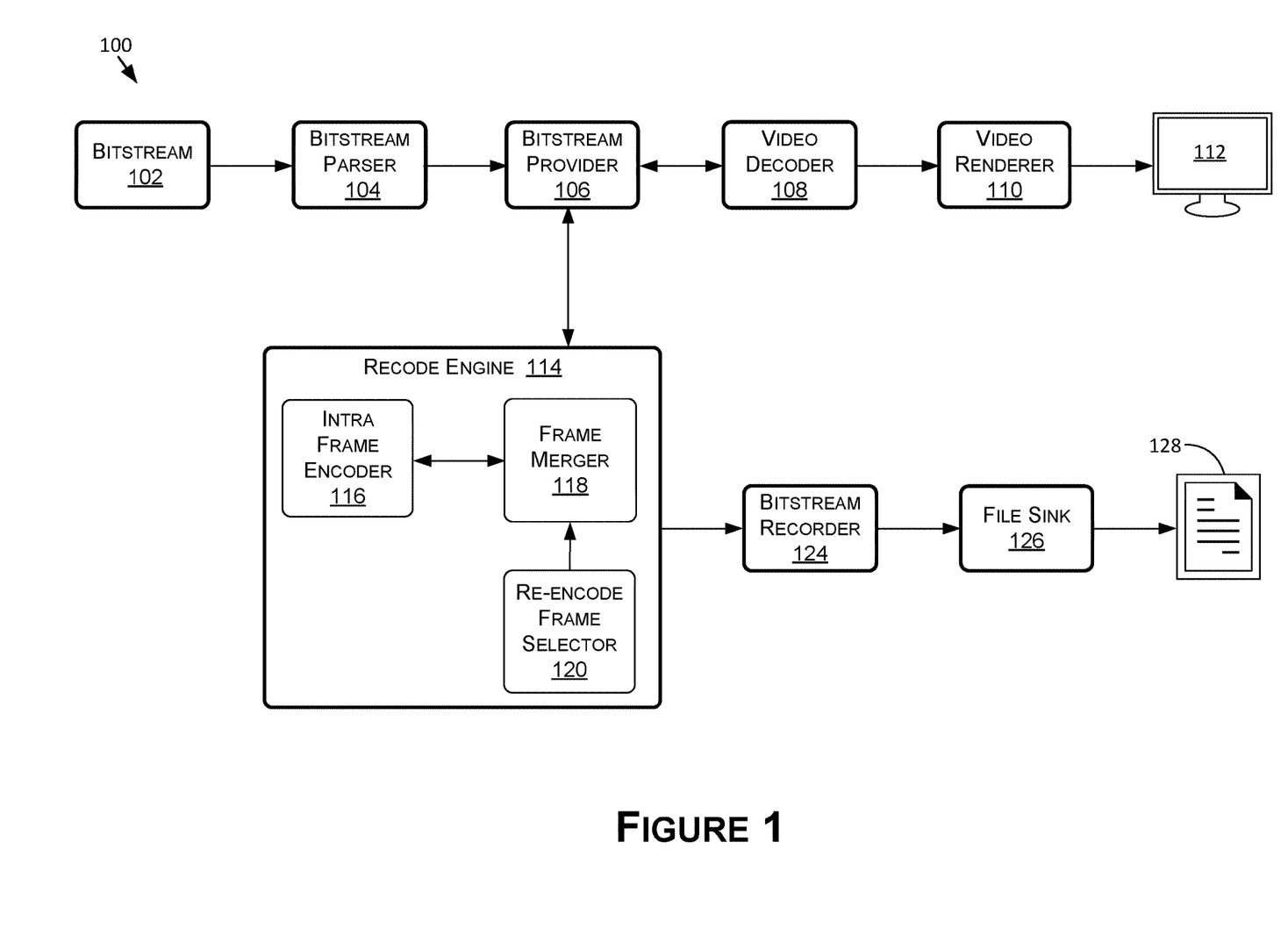
FIG. 1 is an example system diagram for re-encoding picture frames to capture segments in video stream applications, in accordance with some embodiments of the present disclosure.

With reference to FIG. 1, FIG. 1 is an example system diagram of a re-encoding system 100 for re-encoding picture frames to capture segments in video stream applications (e.g., a cloud gamming environment), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Re-encode system 100 may include, among other components and/or devices, bitstream 102, bitstream parser 104, bitstream provider 106, video decoder 108, video renderer 110, user device 112, recode engine 114, bitstream recorder 124, file sink 126, and file 128. In some non-limiting embodiments, the re-encode system 100 (and/or the components and/or features thereof) may be implemented using a game streaming system, such as game streaming system 500 of FIG. 5, described in more detail herein. In other non-limiting embodiments, the re-encode system 100 (and/or the components and/or features thereof) may be implemented using any media streaming system, such as a system for live streaming and/or streaming pre-recorded media. In addition, the re-encode system 100 (and/or components and/or features thereof) may be implemented using one or more computing device(s), such as computing device 600 of FIG. 6, described in more detail herein.

Each of the devices and/or components of the re-encode system 100 may communicate over a network(s) (not shown). The network(s) may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), and/or another type of network. In any example, each of the devices and/or components of the re-encode system 100 may communicate with one or more of the other devices and/or components via one or more of the network(s).

The bitstream parser 104 may be generally configured to parse an incoming bitstream (e.g., video stream, media stream, etc.)—such as bitstream 102—into its GOP structure equivalent. As described herein, the bitstream 102 may be one of any number of bitstreams, such as, for example, a live media video bitstream or a pre-recorded media video bitstream. The bitstream 102 may be received by the re-encode system 100 in a compressed format from a remote device, such as a remote server, a remote user device, and/or another device type within of a streaming environment, a cloud gaming environment (e.g., FIG. 5), and/or another environment for streaming media. Further, the bitstream 102 may be in one of any number of formats, such as, without limitation, a Motion Pictures Expert Group (MPEG) video format (e.g., MP4), an Apple QuickTime Movie (MOV) video format, a Windows Media Video (WMV) video format, a Flash Video Format (FLV), an Audio Video Interleave (AVI) video format, and/or another video format. The GOP structure equivalent of a bitstream, such as the bitstream 102, may take one of any number of GOP structure types, such as a P frame only GOP structure (or other inter-frame only structure) (e.g., IPPPPPP . . . P), as well as an IP frame GOP structure (e.g., IPPPIPPP . . . IPPP). By way of example, the bitstream parser 104 may parse the incoming bitstream 102 associated with an instance of a media stream (e.g., a video game stream in a cloud gaming environment) into its GOP structure equivalent—such as an inter-frame only GOP structure (e.g., IPPPPPP).

The bitstream 102 may be associated with various parameter sets, such as, for example, a sequence parameter set (SPS) and a picture parameter set (PPS). A parameter set may generally contain information (e.g., pixel values, etc.) that is not expected to change from frame to frame in a GOP structure. More particularly, an SPS may generally apply to a series of consecutive frames (e.g., a sequence of pictures) within a GOP structure, while a PPS may generally apply to the decoding (e.g., decompression) of one or more individual frames within a GOP structure. The bitstream 102 may further be associated with a quantization parameter (QP) used to determine quantizer values for frames within the GOP structure. A QP may generally regulate how much spatial detail is retained (e.g., saved) for each frame during video encoding (e.g., compression), as well as the degree to which visual impairments (e.g., block distortion, blurring, edge busyness, mosquito noise, ringing, quantization noise, jerkiness, pixilation, etc.) are introduced into each frame during video encoding.

The bitstream provider 106 may be generally configured to split the parsed bitstream 102 into two separate (e.g., identical) output streams. In operation, a first parsed bitstream may be decoded (e.g., by the video decoder 108) for display to a user (e.g., via the user device 112) and a second parsed bitstream may be decoded (e.g., by the video decoder 108) and used for recording a portion of the bitstream 102—e.g., using the recode engine 114—for later use.

As described above, the video decoder 108 may be generally configured to decode (e.g., decompress) frames included in the GOP structure of the parsed bitstream 102. The video decoder 108 may include, without limitation, any number of types of video decoders (e.g., MPEG-4 Part 2, MPEG-4, etc.). The video renderer 110 may be generally configured to process the parsed and decoded bitstream 102 in order to produce and display a visual representation of the bitstream 102 on the display of the user device 112.

The user device 112 may include, without limitation, a smart phone, a laptop computer, a tablet computer, a desktop computer, a wearable device, a game console, a virtual reality system (e.g., a headset, a computer, a game console, remote(s), controller(s), and/or other components), an NVIDIA SHIELD, a smart-home device that may include an intelligent personal assistant, and/or another type of device capable of supporting at least display of a video stream (e.g., live video stream, pre-recorded video stream, etc.). The user device 112 may be one or more components (e.g., a communication component, network interface, etc.) and features for communicating across one or more networks. As a non-limiting example, to communicate within the re-encode system 100, the user device 112 may use a wired Ethernet connection and/or Wi-Fi connection through a router to access the Internet. In some examples, the user device 112 may include some or all of the components of the example computing device 600 of FIG. 6.

The recode engine 114 may be generally configured to re-encode frames of a decoded (e.g., decompressed) bitstream to enable the capture of segments of the bitstream associated with video stream applications. More particularly, the recode engine 114 may be generally configured to re-encode inter-frames of a bitstream into intra-frames to enable capturing various segments of the bitstream. In some embodiments, the recode engine 114 may re-encode frames of a parsed and decompressed bitstream based on receiving an indication to start a recording. In other embodiments, the recode engine 114 may re-encode frames of a parsed and decompressed bitstream periodically, as described herein. The recode engine 114 may include a re-encode frame selector 120, an intra-frame encoder 116, and a frame merger 118. The re-encode frame selector 120 may be generally configured to select an inter-frame from a portion of a bitstream for re-encoding into an intra-frame. The intra-frame encoder 116 may be generally configured to re-encode an inter-frame into an intra-frame. The frame merger 118 may be generally configured to merge the re-encoded intra-frame into the bitstream to replace the selected inter-frame.

As described herein, the re-encode frame selector 120 may be generally configured to select an inter-frame from a portion of a bitstream for re-encoding into an intra-frame. In some embodiments, the re-encode system 100 may receive an indication to start a recording of a portion of the bitstream 102. The indication may include information indicating which frame in the bitstream to use as the starting point for the recording. For example, a signal may be generated (e.g., in response to a user input) that indicates a point where a recording should be generated. The signal may correspond to an exact frame, in some examples, and the exact frame may be selected. In other examples, the signal may correspond to a frame, or frames, but the re-encode frame selector 120 may select a prior or subsequent frame other the frame the signal corresponds to (e.g., to build in a buffer, in cases where the signal was generated after the actual desired start point for the recording). In such an embodiment, based on receiving the indication to start the recording of the portion of the bitstream at the frame indicated by the indication, the re-encode frame selector 120 may select the frame associated with the starting point from the bitstream 102 for re-encoding. In other embodiments, the re-encode frame selector may be configured to periodically determine which frame in the bitstream 102 to select for re-encoding from an inter-frame into an intra-frame. For example, the re-encode frame selector 120 may be configured to select every $x^{th}$ inter-frame (e.g., every $5^{th}$ inter-frame, every $30^{th}$ inter-frame, etc.) for re-encoding into an intra-frame, or may be configured to select a frame every x number of seconds (e.g., every second, every two seconds, etc.). In such an embodiment, the re-encode frame selector 120 may be configured by a user of the re-encode system 100. Once a selected inter-frame is converted into an intra-frame by the intra-frame encoder 116, the frame merger 118 may be signaled to merge the re-encoded intra-frame into the bitstream to replace the selected inter-frame.

To select an inter-frame for re-encoding, the re-encoding frame selector 120 may transmit a request (e.g., a signal representative of a request) to the video decoder 108 that an uncompressed (e.g., decompressed, decoded) version of the inter-frame that is to be re-encoded is required. Based on receiving the request from the recode engine 114, the video decoder 108 may transmit the uncompressed inter-frame selected for re-encoding to the intra-frame encoder 116 for re-encoding.

As described here, the intra-frame encoder 116 may be generally configured to re-encode an inter-frame into an intra-frame. In some embodiments, the intra-frame encoder 116 may re-encode an inter-frame into an intra-frame based on encoding parameters associated with the bitstream 102 from which the inter-frame was selected. By re-encoding an inter-frame into an intra-frame based at least on encoding parameters associated with the bitstream 102 from which the inter-frame was selected, the newly encoded intra-frame may be more compliant with the bitstream (e.g., is able to be merged back into the bitstream to replace the inter-frame) from which it is encoded. In non-limiting embodiments, the intra-frame encoder 116 may re-encode an inter-frame into an intra-frame using parameters, features, or other information associated with the bitstream 102, such as a SPS, a PPS, a QP, and/or other parameters, features, or information associated with the bitstream 102. In at least one embodiment, the quantization value for the re-encoded intra-frame may be set or determined to at least one step lower than the quantization value for the inter-frame from which it was re-encoded. In this way, compliance with the bitstream 102 (e.g., to ensure the intra-frame can be merged into the bitstream to replace the inter-frame) is more likely to be achieved.

Additionally, while the re-encoded intra-frame may be slightly different from the inter-frame that it is replacing, by re-encoding an inter-frame into an intra-frame and merging it into the bitstream 102, a refresh rate frequency of the bitstream 102 may be increased. Increasing the refresh rate may prevent or reduce errors (e.g., a decrease in perceptual quality of the bit stream due to block distortion, blurring, edge activity, noise, ringing, jerkiness, pixilation, etc.). Setting the quantization value for the re-encoded intra-frame to at least one step below the quantizer value for the inter-frame it is replacing in the bitstream 102 further aids in preventing errors from accumulating.

As described herein, the frame merger 118 may be generally configured to merge the re-encoded intra-frame into the bitstream to replace the selected inter-frame. In embodiments, after the intra-frame encoder 116 re-encodes the inter-frame into the intra-frame, the intra-frame encoder 116 may communicate to (e.g., transmit a signal to) the frame merger 118 that the inter-frame has been re-encoded into an intra-frame. Based on receiving an indication that the inter-frame has been converted into an intra-frame, the frame merger 118 may merge the re-encoded intra-frame into the bitstream (e.g., at the same location as the original inter-frame) to replace the inter-frame. In some embodiments, to merge the intra-frame into the bitstream, the frame merger 118 may update the headers and/or other information of the inter-frames subsequent the re-encoded intra-frame (e.g., P frames) and/or prior to the re-encoded intra-frame (e.g., B frames). As described herein, inter-frames (e.g., P frames or B frames) may generally reference their closest previous intra-frame(s) and/or inter-frame(s). As such, each header included in an inter-frame may designate which intra-frame(s) and/or inter-frame(s) the inter-frame should reference. To ensure prior and/or subsequent inter-frames reference the newly encoded intra-frame, the frame merger 118 may thus be configured to update the headers and/or other information of inter-frames in the bitstream to ensure that the capture segment or portion of the bitstream including the re-encoded intra-frame plays back properly.

The bitstream recorder 124 may be generally configured to extract a segment of a bitstream including the re-encoded intra-frame and output the segment of the bitstream to a file sink 126 for storage or saving to a file for later use (e.g., viewing, sharing, streaming, transmitting, etc.). In one or more embodiments, a file sink may be implemented as a pipeline object that receives media data as the destination for one or more media streams. In embodiments, the bitstream recorder 124 may select the segment based on receiving an indication of which segment of the bitstream a user wants to record. In other embodiments, the bitstream recorder 124 may select the starting point of the segment based on the starting point noted in an indication to start recording.

The file sink 126 may be configured to store the segment(s) of the bitstream, such as in the form of a container file 128. The file sink 126 may be one of any number of media sinks, such as an MP4 file sink, 3GP file sink, WMV file sink, FLV file sink, and/or the like. A container file, such as the container file 128, may be one of any number of container files, such as an MPEG4 container file, 3GP container file, MPEG-2 container file, etc.

By way of example, a viewer A that is viewing a live stream instance of a game being played by gamer B in a cloud gaming environment may decide they want to start recording at a specific time associated with the beginning of a high-intensity combat scene. If the bitstream associated with the live stream of the game being played by gamer B and viewed by viewer A is an inter-frame only bitstream (e.g., an IPPPPPP GOP structure), in such an example, the re-encode system 100 (using the re-encode frame selector 120) may select the inter-frame associated with the starting location or the recording, receive an uncompressed version of the frame from the video decoder 108, convert the inter-frame into an intra-frame using the intra-frame encoder 116, and then merge the intra-frame into the bitstream using the frame merger 118). Thereafter, system 100 may record, using the bitstream recorder 124, and save, using the file sink 126, the segment of the bitstream indicated by viewer A for later use (e.g., viewing, sharing, etc.).

Figure 2A:
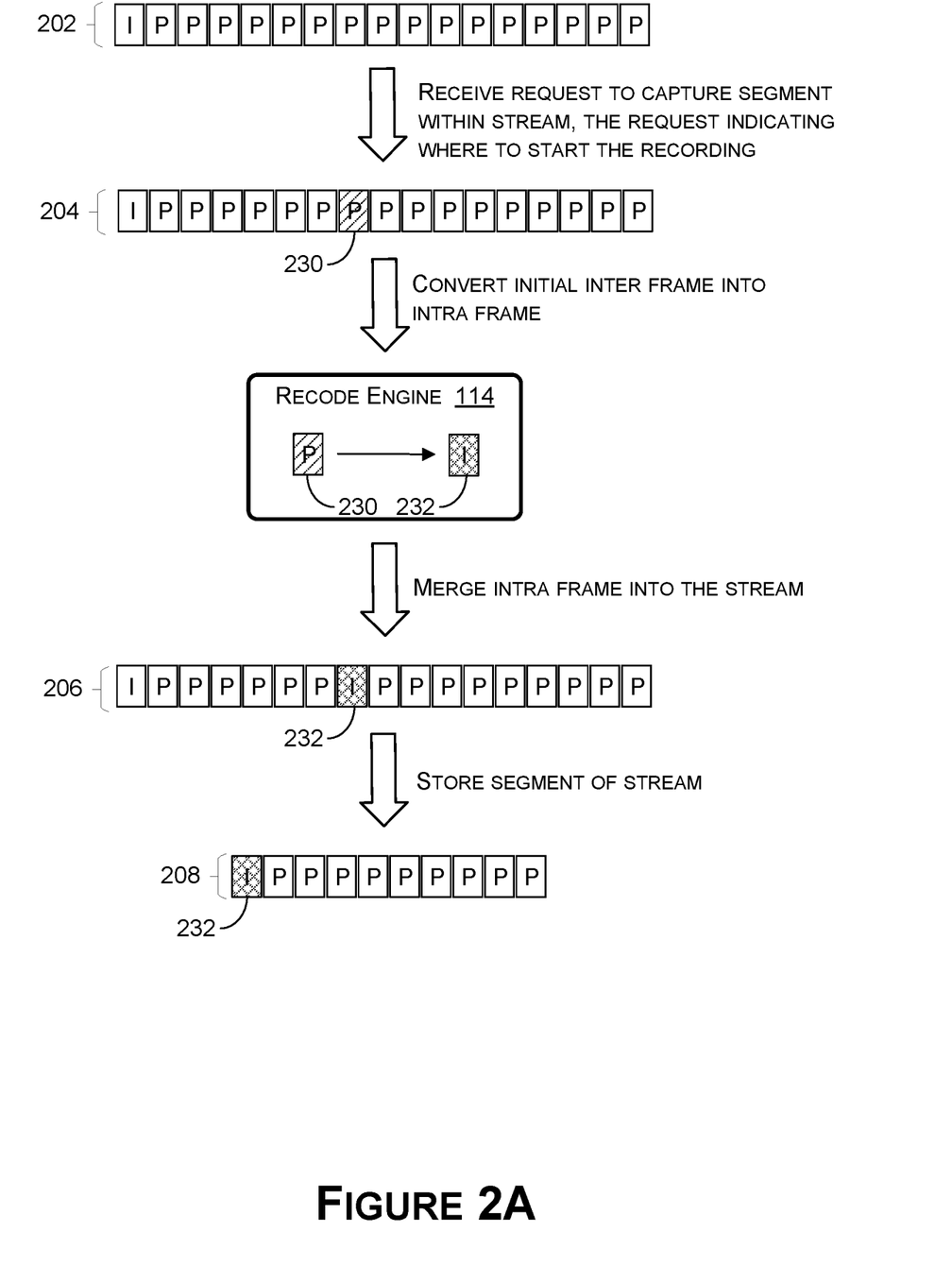
FIG. 2A is a data flow diagram illustrating re-encoding of an inter-frame of an inter-frame only GOP structure into an intra-frame based on receiving an indication to start recording, in accordance with some embodiments of the present disclosure.
Figure 2B:
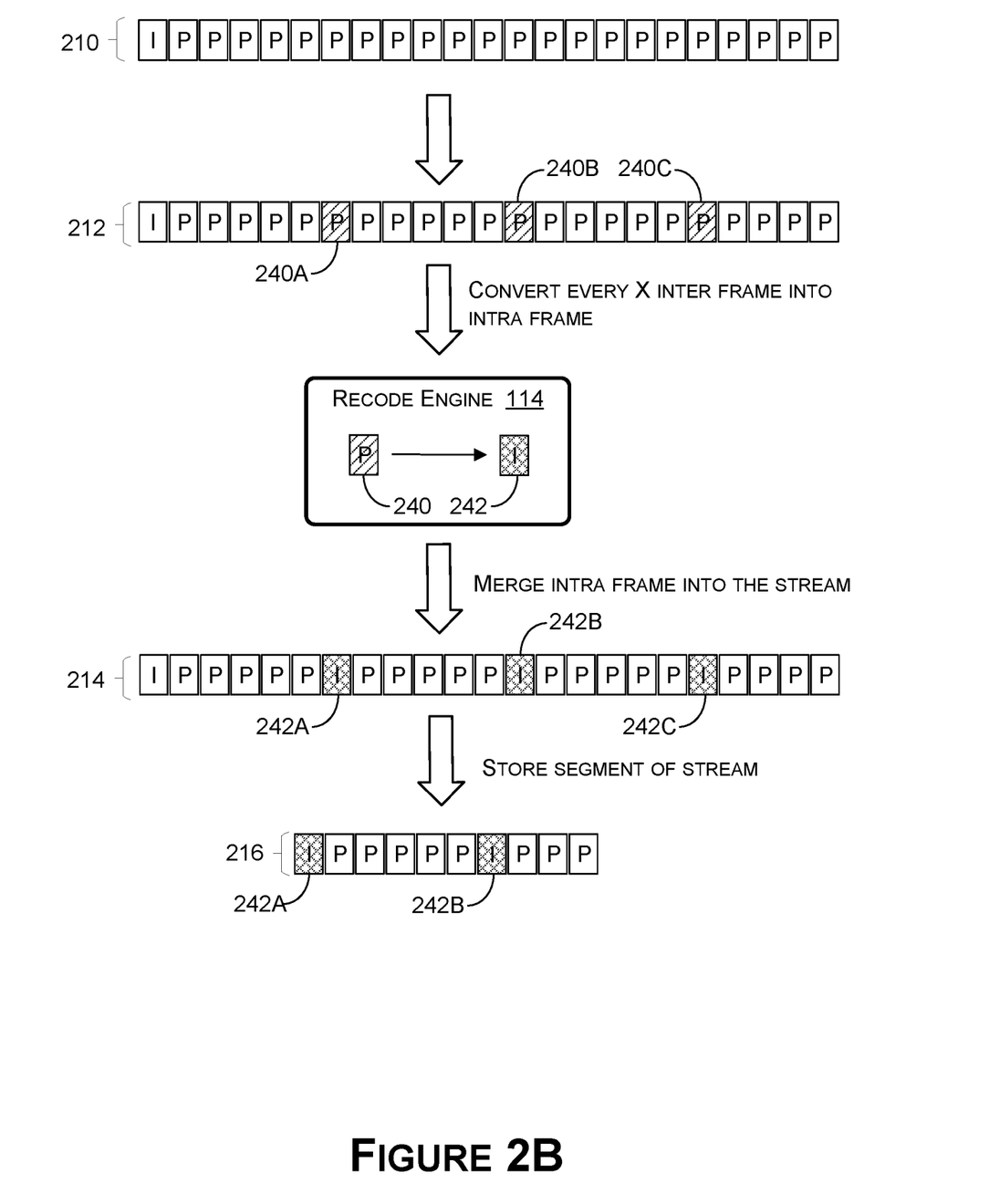
FIG. 2B is a data flow diagram illustrating periodically re-encoding an inter-frame into an intra-frame, in accordance with some embodiments of the present disclosure.
Figure 2C:
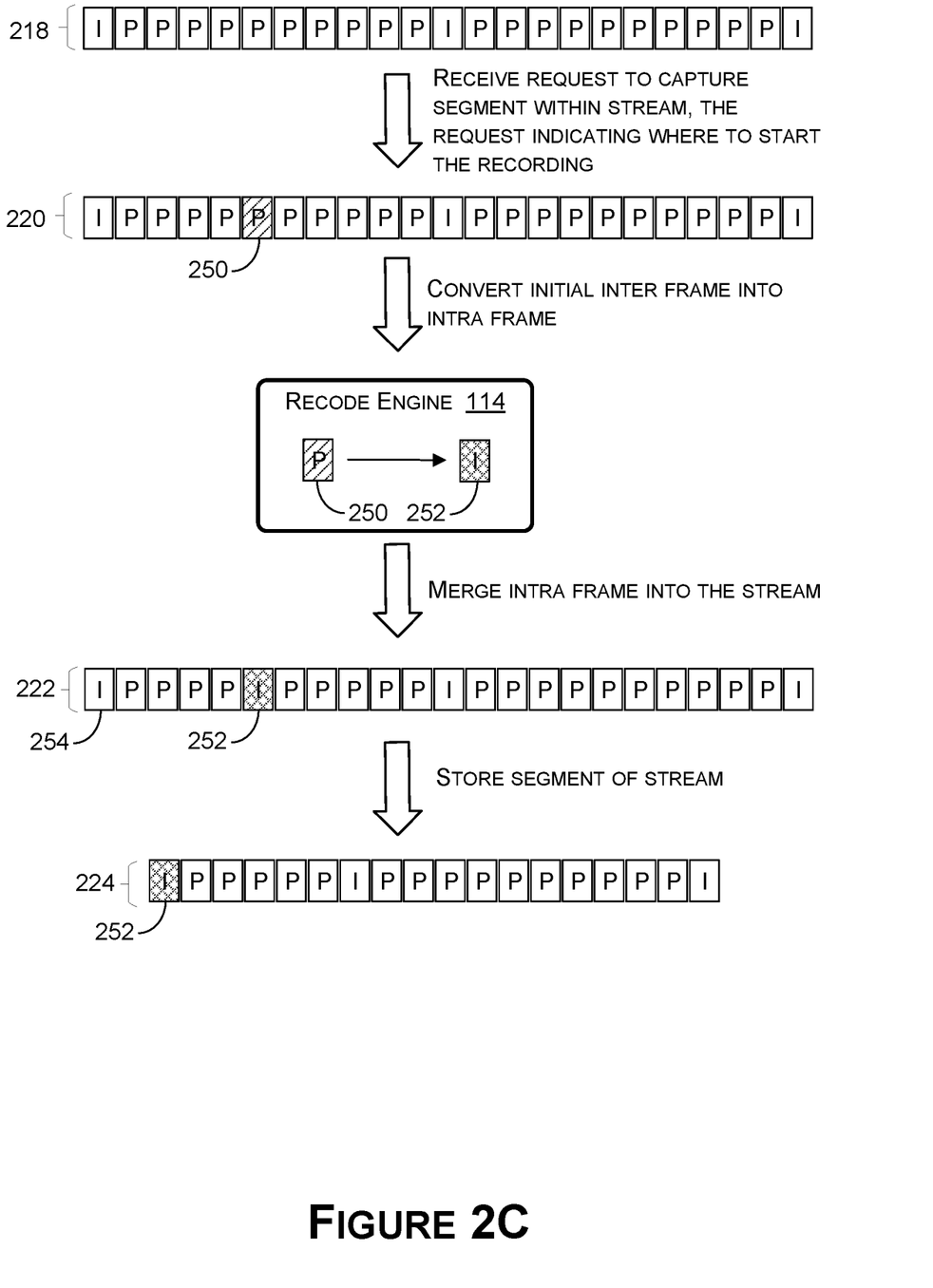
FIG. 2C is a data flow diagram illustrating re-encoding of an inter-frame of an IP frame GOP structure into an intra-frame based on receiving an indication to start recording, in accordance with some embodiments of the present disclosure.

Now with reference to FIGS. 2A-2C, FIGS. 2A-2C illustrate various non-limiting examples of converting inter-frames to intra-frames to capture segments of streams having various GOP stream formats. FIGS. 2A-2C may be described with reference to, and view of, the re-encode system 100 of FIG. 1. However, different or alternative systems may be used to generate the segments described with respect to FIGS. 2A-2C without departing from the scope of the present disclosure.

As an example, and with reference to FIG. 2A, FIG. 2A is a data flow diagram illustrating the re-encoding of an inter-frame of an inter-frame only GOP structure into an intra-frame based on receiving an indication to start recording, in accordance with some embodiments of the present disclosure. In FIG. 2A, a bitstream 202 may be received, where the bitstream 202 may include an inter-frame only GOP structure bitstream. Based on receiving a request to capture a segment of the bitstream 202, where the request may indicate a starting point (e.g., an inter-frame 230) at which to start the recording, the inter-frame 230 associated with the starting point may be identified, as illustrated in segment 204 of the bitstream 202. To convert the inter-frame 230 identified in the segment 204, the inter-frame 230 may be processed by the recode engine 114. As described in detail herein, the recode engine 114 may convert the selected inter-frame 230 into an intra-frame 232 based at least on a SPS, a PPS, a QP, and/or other information associated with the bitstream 202. Once the inter-frame 230 is re-encoded into an intra-frame 232, as illustrated in updated segment 206 of the bitstream 202, the re-encoded intra-frame 232 may be merged (e.g., to replace the inter-frame 230) at the location of the selected (e.g., identified) inter-frame 230 in the segment 204. In embodiments, when merging the re-encoded intra-frame 232, the headers of subsequent inter-frames may be updated to reference the re-encoded intra-frame 232. A captured segment 208 (e.g., which may include the updated segment 206 and/or a portion thereof) associated with the request to capture a segment of the bitstream 202 may then be recorded and stored (e.g., using the bitstream recorder 124 and/or the file sink 126 of FIG. 1). As such, using this process, the captured segment 208 may begin at the re-encoded intra-frame 232.

As another example, and with reference to FIG. 2B, FIG. 2B is a data flow diagram illustrating periodically re-encoding an inter-frame into an intra-frame, in accordance with some embodiments of the present disclosure. In FIG. 2B, a bitstream 210 may be received, where the bitstream 210 may include an inter-frame only GOP structure bitstream. In embodiments, the re-encode system 100 may periodically convert inter-frames 240 (e.g., inter-frame 240A, 240B, and 240C), identified in the bitstream 212 by slanted lines, associated with the bitstream 210 into intra-frames 242 (e.g., intra-frames 242A, 242B, and 242C, respectively). For example, the re-encode engine 114 may identify every $x^{th}$ frame, or a frame after every x time interval, to convert from an inter-frame 240 to an intra-frame 242 as indicated by the bitstream 212. As noted throughout, the re-encode engine 114 may be configured (e.g., manually or otherwise) to select inter-frames 240 from the bitstream 210 based on the periodicity. For example, the re-encode engine 114 may select every $5^{th}$ inter-frame 240, or it may select every $30^{th}$ inter-frame 240, to convert to an intra-frame 242. As described in detail herein, the recode engine 114 may convert the selected inter-frames 240 into intra-frames 242 based at least on a SPS, a PPS, a QP, and/or other information associated with bitstream 210. Once the inter-frames 240 are re-encoded into intra-frames 242, and as can be seen in converted segment 214, the re-encoded intra-frames 242 may be merged (e.g., to replace the inter-frames 240) at the location of the selected (e.g., identified) inter-frames 240 in segment 210. In embodiments, when merging the re-encoded intra-frames 242, the headers of subsequent and/or prior inter-frames may be updated to reference the re-encoded intra-frames 242. Because the updated segment 214 may be generated based on the periodicity, when a request to capture a captured segment 216 of the stream is received, the captured segment 216 may be generated using the updated segment 214.

As a further example, and with reference to FIG. 2C, FIG. 2C is a data flow diagram illustrating the re-encoding of an inter-frame of an IP frame GOP structure into an intra-frame based on receiving an indication to start recording, in accordance with some embodiments of the present disclosure. In FIG. 2C, a bitstream 218 may be received, where the bitstream 218 may include an IP frame GOP structure bitstream. Based on receiving a request to capture a segment of the bitstream 218, where the request may indicate a starting point (e.g., an inter-frame 250) at which to start the recording, the inter-frame 250 associated with the starting point may be identified. To convert the inter-frame 250 identified in the segment 220, the inter-frame 250 may be processed by the recode engine 114. As described in detail herein, the recode engine 114 may convert the selected inter-frame 250 into an intra-frame 252 based at least on a SPS, PPS, QP, and/or other information associated with the bitstream 218. Once the inter-frame 250 is re-encoded into an intra-frame 252, as illustrated in updated segment 222, the re-encoded intra-frame 252 may be merged (e.g., to replace the inter-frame 250) at the location of the selected (e.g., identified) inter-frame 250 in the captured segment 224. In embodiments, when merging the re-encoded intra-frame 252, the headers of subsequent inter-frames may be updated to reference the re-encoded intra-frame 252. The captured segment 224 may then be captured from the updated segment 222 and stored (e.g., using the bitstream recorder 124 and/or the file sink 126 of FIG. 1). As such, using this process, the captured segment 224 may begin at the re-encoded intra-frame 252, instead of beginning at original intra-frame 254—thereby resulting in a more accurate or more desired (e.g., based on the user request) grouping of frames in the captured segment 224.

Figure 3:
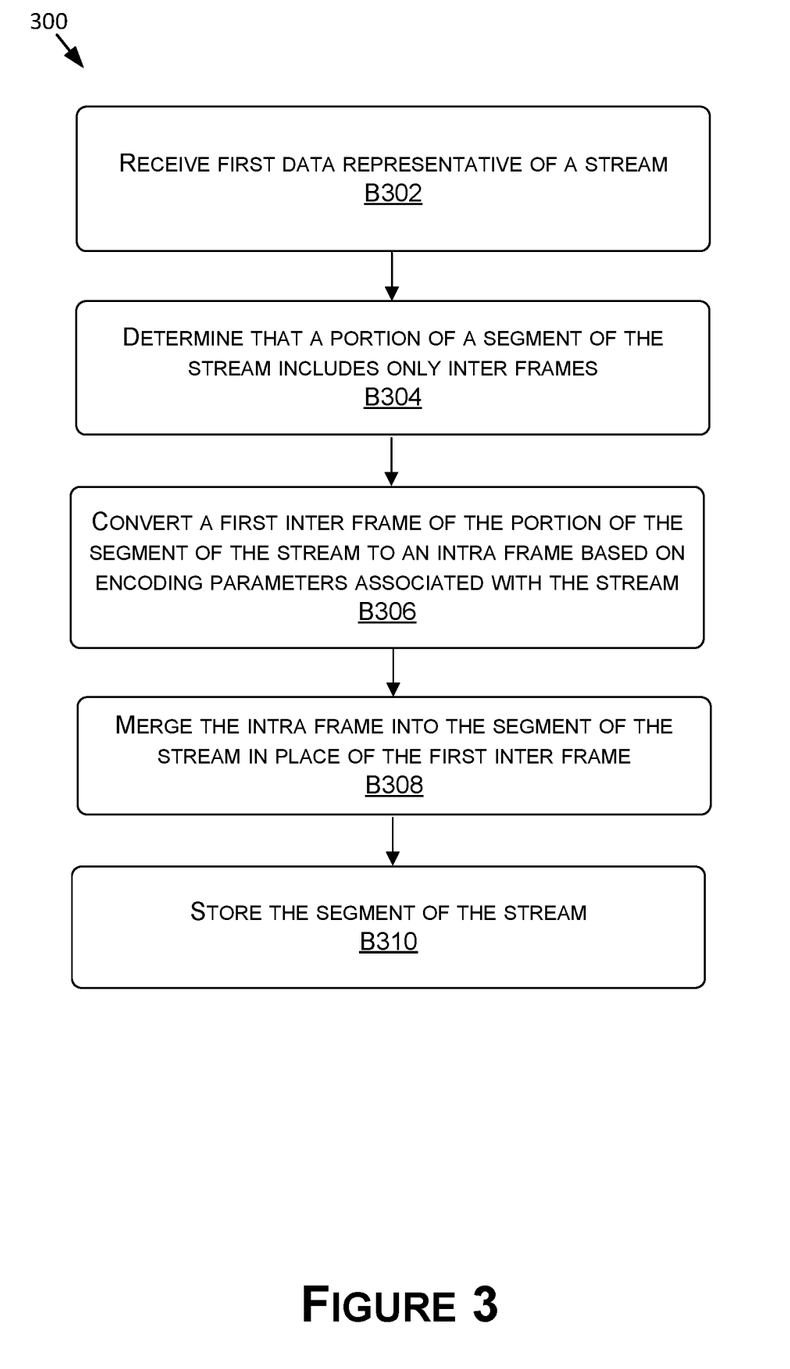
FIG. 3 is a flow diagram showing a method for re-encoding picture frames to capture segments in video stream applications, in accordance with some embodiments of the present disclosure.
Figure 4:
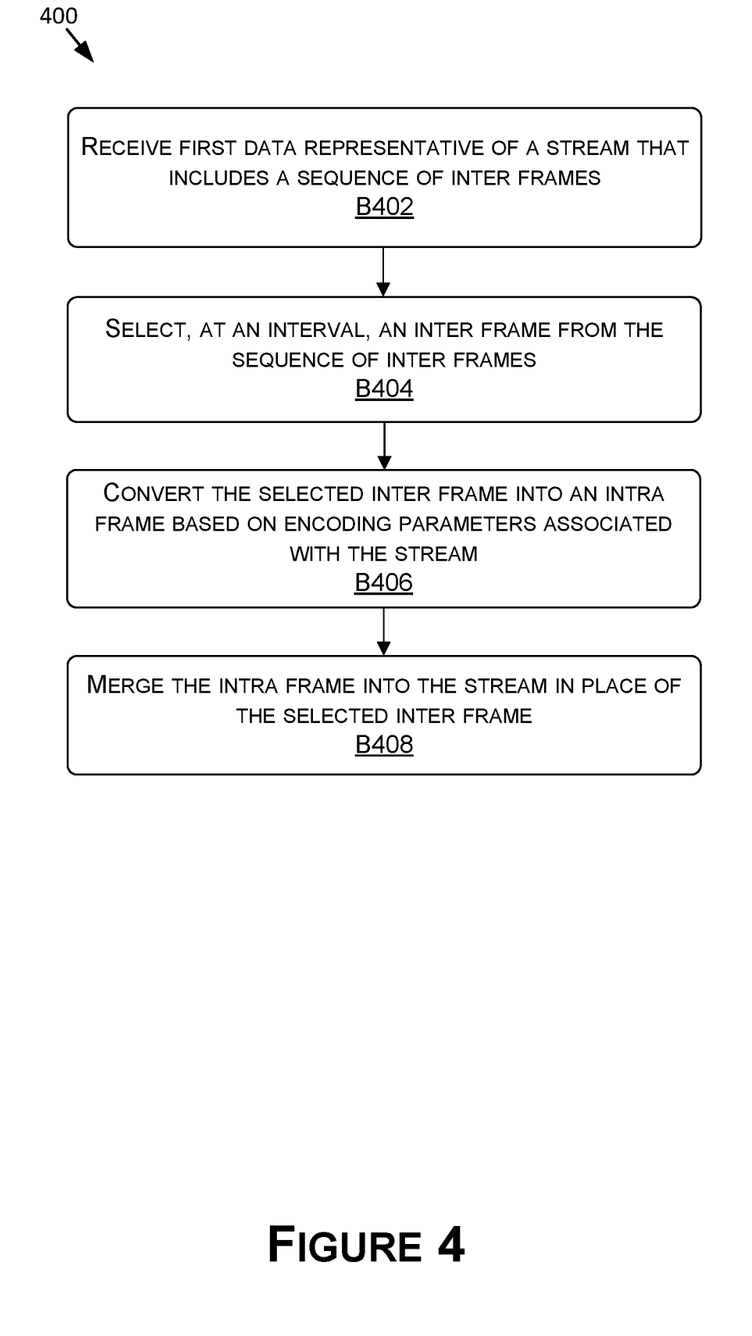
FIG. 4 is a flow diagram showing a method for periodically re-encoding an inter-frame into an intra-frame, in accordance with some embodiments of the present disclosure.

Now referring to FIGS. 3 and 4, each block of methods 300 and 400, described herein, comprises a computing process that may be performed using any combination of hardware, firmware, and/or software. For instance, various functions may be carried out by a processor executing instructions stored in memory. The methods 300 and 400 may also be embodied as computer-usable instructions stored on computer storage media. The methods 300 and 400 may be provided by a standalone application, a service or hosted service (standalone or in combination with another hosted service), or a plug-in to another product, to name a few. In addition, the methods 300 and 400 are described, by way of example, with respect to the system of FIG. 1. However, these methods 300 and 400 may additionally or alternatively be executed by any one system, or any combination of systems, including, but not limited to, those described herein.

With reference to FIG. 3, FIG. 3 is a flow diagram showing a method 300 for re-encoding picture frames to capture segments in video stream applications, in accordance with some embodiments of the present disclosure. The method 300, at block B302, includes receiving first data representative of a stream. For example, the bitstream 102 may be received by the bitstream parser 104 of FIG. 1. The bitstream 102 may include associated information or data that represents a SPS, a PPS, a QP, and/or other information associated with frames of the bitstream 102. The bitstream 102 may be a live video stream, a pre-recorded video stream, and/or another stream type. When parsed, such as by the bitstream parser 104, the bitstream 102 may be associated with one of any number of GOP structure types, such as an inter-frame only GOP structure type.

The method 300, at block B304, includes determining that a portion of a segment of the stream includes only inter-frames. For example, the re-encode system 100 may receive an indication to start a recording of a portion of a bitstream. The indication may include information indicating which frame in the bitstream to use as the starting point for the recording. In such an embodiment, based on receiving the indication to start the recording of the portion of the bitstream at the frame indicated by the indication, a re-encode frame selector 120 may determine that the starting point (e.g., portion) of the segment to record is an inter-frame, and/or that no intra-frames are within a threshold number of frames from the inter-frame.

The method 300, at block B306, includes converting a first inter-frame of the portion of the segment of the stream to an intra-frame based on encoding parameters associated with the stream. As discussed herein, encoding parameters may include at least one of an SPS, PPS, and/or a QP. For example, re-encoding an inter-frame into an intra-frame based at least on encoding parameters associated with the bitstream from which the inter-frame may ensure that upon re-encoding, the newly encoded intra-frame is compliant with the original bitstream (e.g., is able to be merged back into the original bitstream to replace the inter-frame).

The method 300, at block B308, includes merging the intra-frame into the segment of the stream in place of the first inter-frame. For example, to merge the intra-frame into the bitstream, the frame merger 118 may update the headers of the inter-frames subsequent to and/or prior to the re-encoded intra-frame.

The method 300, at block B310, includes storing the segment of the stream. For example, the segment of the bitstream 102 may be stored for later use (e.g., viewing, sharing, etc.). Here, the bitstream recorder 124 may extract the segment of the bitstream to be recorded, where the segment includes the re-encoded intra-frame. The bitstream recorder 124 may output the segment of the bitstream to the file sink 126 for saving to a file for later use (e.g., viewing, sharing, transmitting, etc.). In embodiments, the bitstream recorder may select 124 the segment based on receiving an indication of which segment of the bitstream a user wants to record. In other embodiments, the bitstream recorder 124 may select the starting point of the segment to be recorded and stored based on the starting point noted in the indication to start recording.

Now referring to FIG. 4, FIG. 4 is a flow diagram showing a method 400 for periodically re-encoding an inter-frame into an intra-frame, in accordance with some embodiments of the present disclosure. The method 400, at block B402, includes receiving first data representative of a stream that includes a sequence of inter-frames. For example, the bitstream 102 may be received by the bitstream parser 104. The bitstream 102 may include various associated information, such as a SPS, a PPS, a QP, and/or other information. The bitstream 102 may be a live video stream, a pre-reordered video stream, and/or another video stream type. When parsed by the bitstream parser 104, the bitstream 102 may be associated with one of any number of GOP structure types, such as an inter-frame only GOP structure type.

The method 400, at block B404, includes selecting, at an interval, an inter-frame from the sequence of inter-frames. For example, in some embodiments, rather than converting an inter-frame into an intra-frame based on receiving an indication to start a recording, the re-encode system 100 may analyze the incoming bitstream and determine when an intra-frame needs to be added into the bitstream. The re-encode system 100 may determine when an intra-frame should be converted into an intra-frame based on the GOP length of the incoming bitstream 102. In other embodiments, the re-encode system 100 may determine when an intra-frame should be converted into an intra-frame based on a hardcoded periodicity (e.g., every $5^{th}$ frame, every $30^{th}$ frame, etc.).

The method 400, at block B406, includes converting the selected inter-frame into an intra-frame based on encoding parameters associated with the stream. For example, as discussed herein, encoding parameters may include at least one of a SPS, a PPS, a QP, and/or other information associated with frames represented by and included within the bitstream 102. Re-encoding an inter-frame into an intra-frame using encoding parameters associated with the bitstream 102 from which the inter-frame was selected ensures that upon re-encoding, the newly encoded intra-frame is compliant with the original bitstream (e.g., is able to be merged back into the original bitstream to replace the inter-frame).

The method 400, at block B408, includes merging the intra-frame into the stream in place of the selected inter-frame. For example, to merge the intra-frame into the bitstream, the frame merger 118 may update the headers of the inter-frames subsequent to and/or prior to the re-encoded intra-frame.

Figure 5:
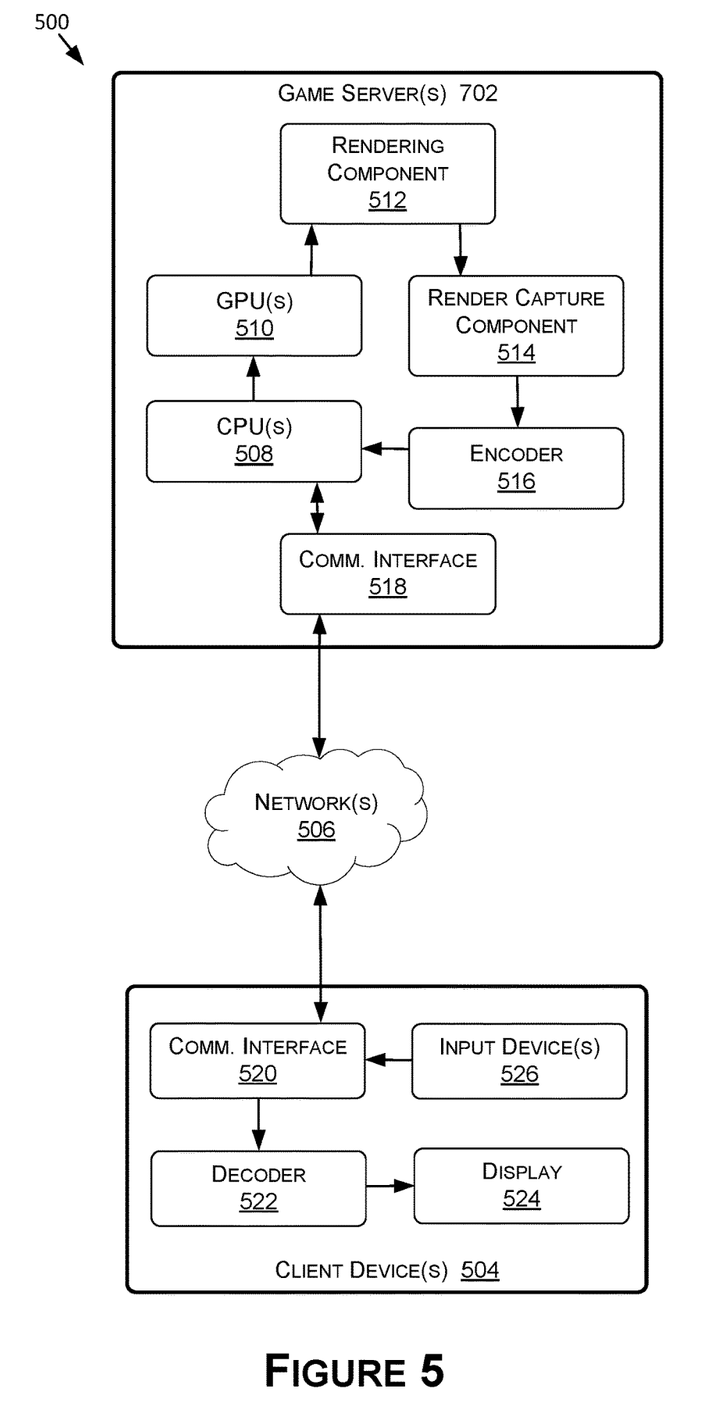
FIG. 5 is an example system diagram for a game streaming system, in accordance with some embodiments of the present disclosure.

Now referring to FIG. 5, FIG. 5 is an example system diagram for a game streaming system 500, in accordance with some embodiments of the present disclosure. FIG. 5 includes game server(s) 502 (which may include similar components, features, and/or functionality to the computing device 600 of FIG. 6), client device(s) 504 (which may include similar components, features, and/or functionality to the computing device 600 of FIG. 6), and network(s) 506. In some embodiments, the system 500 may be implemented as at least part of the re-encoding system 100. For example, the cloud computing environment of the system 500 may be leveraged by the re-encoding system 100 where, in such embodiments, the components and/or functionality of re-encoding system may be similar to the client device(s) 504.

In the system 500, for a game session, the client device(s) 504 may only receive input data in response to inputs to the input device(s) 526, transmit the input data to the game server(s) 502, receive encoded display data from the game server(s) 502, and display the display data on the display 524. As such, the more computationally intense computing and processing is offloaded to the game server(s) 502 (e.g., rendering of the game session is executed by the GPU(s) of the game server(s) 502), and the game session is streamed to the client device(s) 504 from the game server(s) 502—thereby reducing the requirements of the client device(s) 504 for graphics processing and rendering.

For example, with respect to an instantiation of a game session, a client device 504 may be displaying a frame of the game session on the display 524 based on receiving the display data from the game server(s) 502. The client device 504 may receive an input to one of the input device(s) and generate input data in response. The client device 504 may transmit the input data to the game server(s) 502 via the communication interface 520 and over the network(s) 506 (e.g., the Internet), and the game server(s) 502 may receive the input data via the communication interface 518. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 512 may render the game session (e.g., representative of the result of the input data) and the render capture component 514 may capture the rendering of the game session as display data (e.g., as image data capturing the rendered frame of the game session). The encoder 516 may then encode the display data to generate encoded display data and the encoded display data may be transmitted to the client device 504 over the network(s) 506 via the communication interface 518. The client device 504 may receive the encoded display data via the communication interface 520 and the decoder 522 may decode the encoded display data to generate the display data. The client device 504 may then display the display data via the display 524.

In some embodiments, the encoded display data may represent the bitstream 102 of FIG. 1, such that a segment of the encoded display data may be captured by the re-encode system 100 to generate a captured segment of the instance of the game. As such, in contrast to conventional systems that may require the entire stream of the game instance being received, stored, and processed prior to capturing a segment thereof, the re-encode system 100 may allow for generation of segments (e.g., highlights) of the instance of the game during live gameplay at any point during the stream.

Figure 6:
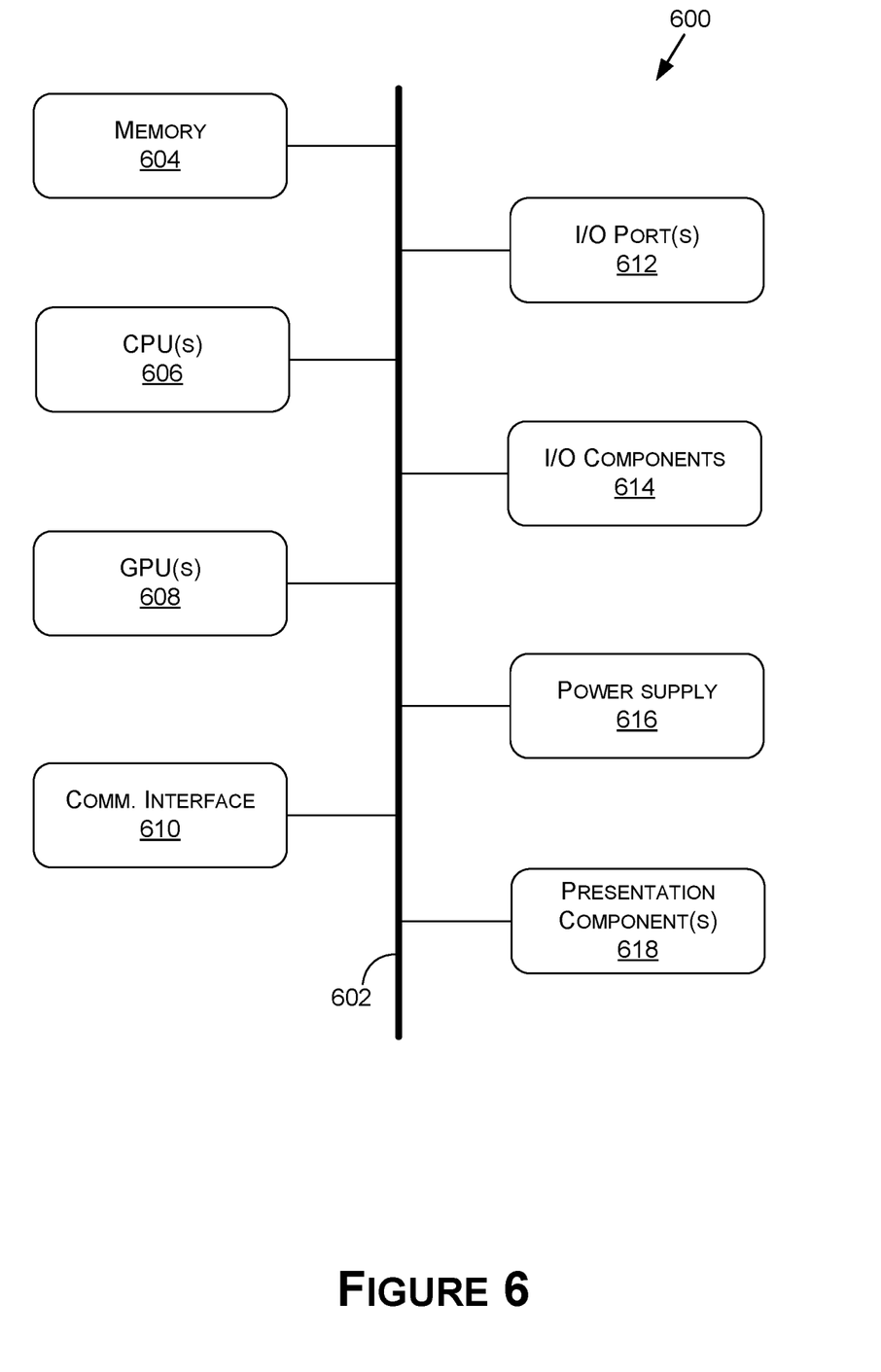
FIG. 6 is a block diagram of an example computing device suitable for use in implementing some embodiments of the present disclosure.

FIG. 6 is a block diagram of an example computing device 600 suitable for use in implementing some embodiments of the re-encoding system 100 of the present disclosure. Computing device 600 may include a bus 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, and one or more presentation components 618 (e.g., display(s)).

Although the various blocks of FIG. 6 are shown as connected via the bus 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The bus 602 may represent one or more busses, such as an address bus, a data bus, a control bus, or a combination thereof. The bus 602 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 606 may be configured to execute the computer-readable instructions to control one or more components of the computing device 600 to perform one or more of the re-encoding methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an ARM processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

The GPU(s) 608 may be used by the computing device 600 to render graphics (e.g., 3D graphics). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data. The display memory may be included as part of the memory 604. The GPU(s) 708 may include two or more GPUs operating in parallel (e.g., via a link). When combined together, each GPU 608 may generate pixel data for different portions of an output image or for different output images (e.g., a first GPU for a first image and a second GPU for a second image). Each GPU may include its own memory, or may share memory with other GPUs.

In examples where the computing device 600 does not include the GPU(s) 608, the CPU(s) 606 may be used to render graphics.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:
1. A processor comprising:
   processing circuitry to:
      receive, during an instance of a user-interactive software application hosted using a remote computing device, an input indicative of a request to capture at least a portion of an encoded video output, wherein the encoded video output is generated using the remote computing device and is responsive to one or more user inputs received to one or more input devices corresponding to a local computing device during the instance of the user-interactive software application;

determine, based at least on the input, that an initial frame of a bitstream corresponding to the at least the portion of the encoded video output is an inter-frame;

receive, based at least on the initial frame being the inter-frame, a decoded instance of the inter-frame;

convert the decoded instance of the inter-frame to an intra-frame based at least on one or more encoding parameters associated with the bitstream;

merge the intra-frame into the bitstream in place of the inter-frame to generate an updated bitstream corresponding to the at least the portion of the encoded video output; and perform one or more operations using the updated bitstream.

2. The processor of claim 1, wherein the decoded instance of the inter-frame is generated based at least on an instance of the bitstream decoded using a decoder to generate display data for display by the local computing device.

3. The processor of claim 1, wherein the one or more encoding parameters are determined from at least one of a Sequence Parameter Set (SPS) or a Picture Parameter Set (PPS) associated with the bitstream.

4. The processor of claim 1, wherein the one or more operations include at least one of storing the updated bitstream as a highlight clip, causing display of the updated bitstream, or transmitting data representative of the updated bitstream to the remote computing device or another computing device.

5. The processor of claim 1, wherein the processing circuitry is further to update header information of one or more inter-frames of the updated bitstream subsequent the intra-frame such that the one or more inter-frames reference the intra-frame.

6. The processor of claim 1, wherein the processing circuitry is further to convert one or more inter-frames of the bitstream to one or more intra-frames at a predetermined interval, wherein at least one additional portion of the encoded video output is generated using an additional intra-frame of one or more intra-frames.

7. The processor of claim 1, wherein:
a first instance of the bitstream is used to cause display of the bitstream at the local computing device;
a second instance of the bitstream is used to generate the updated bitstream segment; and
the decoded instance of the inter-frame corresponds to the first instance of the bitstream.

8. The processor of claim 1, wherein the bitstream is generated in a first Motion Picture Experts Group (MPEG) format, and the processing circuitry is further to store the updated bitstream in a second MPEG format different from the first MPEG format.

9. The processor of claim 1, wherein the processing circuitry is further to:
cause a display to present the decoded instance of the inter-frame,
wherein the input indicative of the request to capture the at least the portion of the encoded video output occurs while the display is presenting the decoded instance of the inter-frame.

10. The processor of claim 1, wherein the processing circuitry is further to:
cause a display to present a frame of the bitstream segment of the bitstream, wherein the input indicative of the request to capture the at least the portion of the encoded video output occurs while the display is presenting the frame; and
identify the initial frame based at least on the initial frame being before the frame.

11. The processor of claim 1, wherein:
the user-interactive software application is a game; and
the processing circuitry is further to:
receive, using the one or more input devices of the local computing device, the one or more inputs during the instance of the game; and
generate input data representative of the one or more inputs.

12. A system comprising:
one or more processing units comprising processing circuitry to:
receive, using a local computing device, a bitstream representative of an encoded video output from a remote computing device, the bitstream corresponding to an instance of a user-interactive software application, the encoded video output generated by the remote computing device based at least on one or more inputs received by the local computing device during the instance of the user-interactive software application;
receive, using one or more input devices and during the instance of the user-interactive software application, an input indicative of a request to capture at least a portion of the encoded video output;
determine, based at least on the request, that an initial frame of a bitstream segment of the bitstream corresponding to the at least the portion of the encoded video output is an inter-frame;
retrieve, based at least on the initial frame being the inter-frame, a decoded instance of the inter-frame;
convert the decoded instance of the inter-frame to an intra-frame;
merge the intra-frame into the bitstream segment in place of the inter-frame to generate an updated bitstream segment corresponding to the at least the portion of the encoded video output; and
perform one or more operations using the updated bitstream segment.

13. The system of claim 12, wherein the decoded instance of the inter-frame is generated based at least on an instance of the bitstream decoded by a decoder to generate display data for display by the local computing device.

14. The system of claim 12, wherein the decoded instance of the inter-frame is converted to the intra-frame based at least on one or more encoding parameters, the one or more encoding parameters being determined from at least one of a Sequence Parameter Set (SPS) or a Picture Parameter Set (PPS) associated with the bitstream.

15. The system of claim 12, wherein the one or more operations include at least one of storing the updated bitstream segment as a highlight clip, causing display of the updated bitstream segment, or transmitting data representative of the updated bitstream segment to the remote computing device or another computing device.

16. The system of claim 12, wherein the processing circuitry is further to update header information of one or more inter-frames of the updated bitstream segment subsequent the intra-frame such that the one or more inter-frames reference the intra-frame.

17. The system of claim 12, wherein the processing circuitry is further to convert one or more inter-frames of the bitstream to one or more intra-frames at a predetermined interval, wherein at least one additional portion of the encoded video output is generated using an additional intra-frame of the one or more intra-frames.

18. The system of claim 12, wherein:
    a first instance of the bitstream is used to cause display of the bitstream at the local computing device;
    a second instance of the bitstream is used to generate the updated bitstream segment; and
    the decoded instance of the inter-frame corresponds to the first instance of the bitstream.

19. A method comprising:
    sending, using a local computing device and to a remote computing device hosting an instance of a user-interactive software application, input data representative of one or more inputs received to one or more input devices of the local computing device during the instance of the user-interactive software application;
    receiving, using the local computing device and from the remote computing device, a bitstream representative of an encoded video output from the remote computing device and corresponding to the instance of the user-interactive software application, the encoded video output generated by the remote computing device based at least on the input data;
    receiving, using the one or more input devices and during the instance of the user-interactive software application, an input indicative of a request to capture at least a portion of the encoded video output, the at least the portion of the encoded video output corresponding to an inter-frame-only portion of the bitstream; and
    generating, from the inter-frame-only portion of the bitstream, a highlight clip corresponding to the instance of user-interactive software application based at least on converting an inter-frame of inter-frame-only portion of the bitstream to an intra-frame.

20. The method of claim 19, further comprising causing display of a first instance of the bitstream on a display of the local computing device, wherein:
    the highlight clip is generated using a second instance of the bitstream; and
    the inter-frame corresponds to the first instance of the bitstream.

\* \* \* \* \*